US012587383B2

(12) United States Patent
Wang et al.

(10) Patent No.: US 12,587,383 B2
(45) Date of Patent: Mar. 24, 2026

(54) METHOD AND SYSTEM FOR OUT-OF-BAND USER IDENTIFICATION IN THE METAVERSE VIA BIOGRAPHICAL (BIO) ID

(71) Applicant: AT&T Intellectual Property I, L.P., Atlanta, GA (US)

(72) Inventors: Wei Wang, Harrison, NJ (US); Lars Benjamin Johnson, Brooklyn, NY (US); Mikhail Istomin, Brooklyn, NY (US); Rachel Rosencrantz, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 286 days.

(21) Appl. No.: 17/973,072

(22) Filed: Oct. 25, 2022

(65) Prior Publication Data

US 2024/0137223 A1 Apr. 25, 2024
US 2024/0235839 A9 Jul. 11, 2024

(51) Int. Cl.
*H04L 9/32* (2006.01)
*H04L 9/40* (2022.01)
*H04L 41/16* (2022.01)

(52) U.S. Cl.
CPC .......... *H04L 9/3231* (2013.01); *H04L 9/3236* (2013.01); *H04L 41/16* (2013.01); *H04L 63/0861* (2013.01); *H04L 63/104* (2013.01)

(58) Field of Classification Search
CPC .. G06F 9/3231; G06F 9/3236; G06F 63/0861; G06F 63/10–108; G06F 41/16;
(Continued)

(56) References Cited

U.S. PATENT DOCUMENTS 8,406,428 B2 * 3/2013 Bauchot ................ H04L 9/3271
713/168
2008/0209227 A1 * 8/2008 Venkatesan ........... H04L 9/3236
713/186
(Continued)

FOREIGN PATENT DOCUMENTS

KR 20180105405 A * 9/2018
WO WO-2022196387 A1 * 9/2022 ......... G06F 3/04815

OTHER PUBLICATIONS

Kürtünlüogğlu P, Akdik B, Karaarslan E. Security of virtual reality authentication methods in metaverse: An overview. arXiv preprint arXiv:2209.06447. Sep. 14, 2022. (Year: 2022).*

*Primary Examiner* — Madhuri R Herzog
(74) *Attorney, Agent, or Firm* — Guntin & Gust, PLC; Erik Boyd

(57) ABSTRACT

Aspects of the subject disclosure may include, for example, detecting a need to verify an identity of a particular user in the metaverse, obtaining a particular hash/encoding associated with the particular user, wherein the particular hash/encoding is generated based on processing of a video, image, voice recording, or biometric information associated with the particular user, retrieving a second hash/encoding from a user profile of a first user, wherein the second hash/encoding corresponds to a second user and is generated based on processing of a video, image, voice recording, or biometric information associated with the second user, performing a comparison of the second hash/encoding and the particular hash/encoding, and based on a determination that there is a match, identifying that the particular user corresponds to the second user, resulting in a verification of the identity of the particular user. Other embodiments are disclosed.

20 Claims, 12 Drawing Sheets

220

(58) Field of Classification Search
CPC . H04L 9/3231; H04L 9/3236; H04L 63/0861;
H04L 63/10–108; H04L 41/16
See application file for complete search history.

(56) References Cited

U.S. PATENT DOCUMENTS

| | | | |
|---|---|---|---|
| 2012/0154557 A1* | 6/2012 | Perez | G06F 3/017 |
| | | | 348/E13.001 |
| 2018/0139203 A1* | 5/2018 | Dolan | G06V 20/20 |
| 2023/0156023 A1* | 5/2023 | Albero | H04L 63/0861 |
| | | | 726/4 |

\* cited by examiner

200

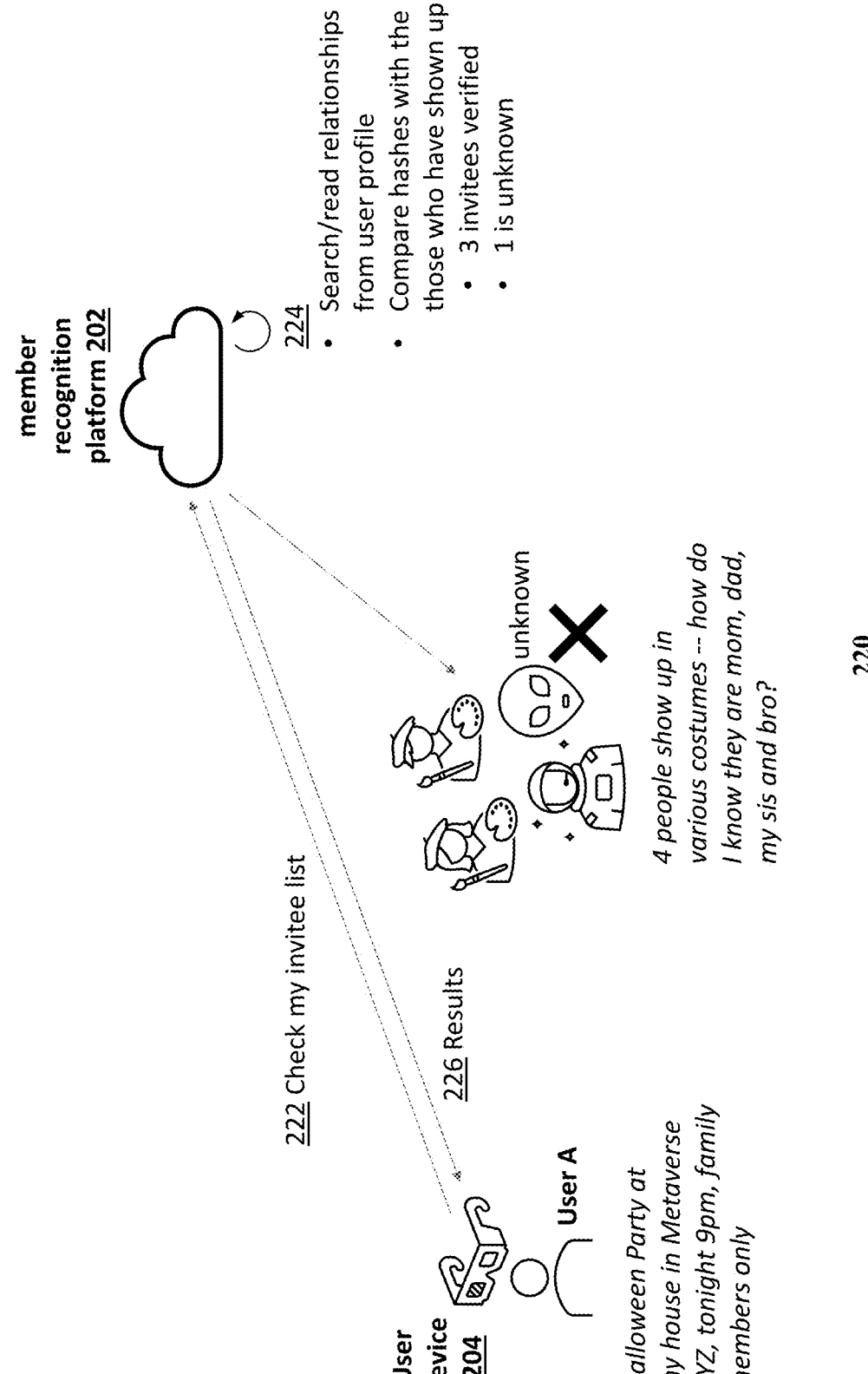

member recognition platform 202

224
- Search/read relationships from user profile
- Compare hashes with the those who have shown up:
  - 3 invitees verified
  - 1 is unknown unknown 4 people show up in various costumes -- how do I know they are mom, dad, my sis and bro?

222 Check my invitee list

226 Results

User Device 204

User A

Halloween Party at my house in Metaverse XYZ, tonight 9pm, family members only

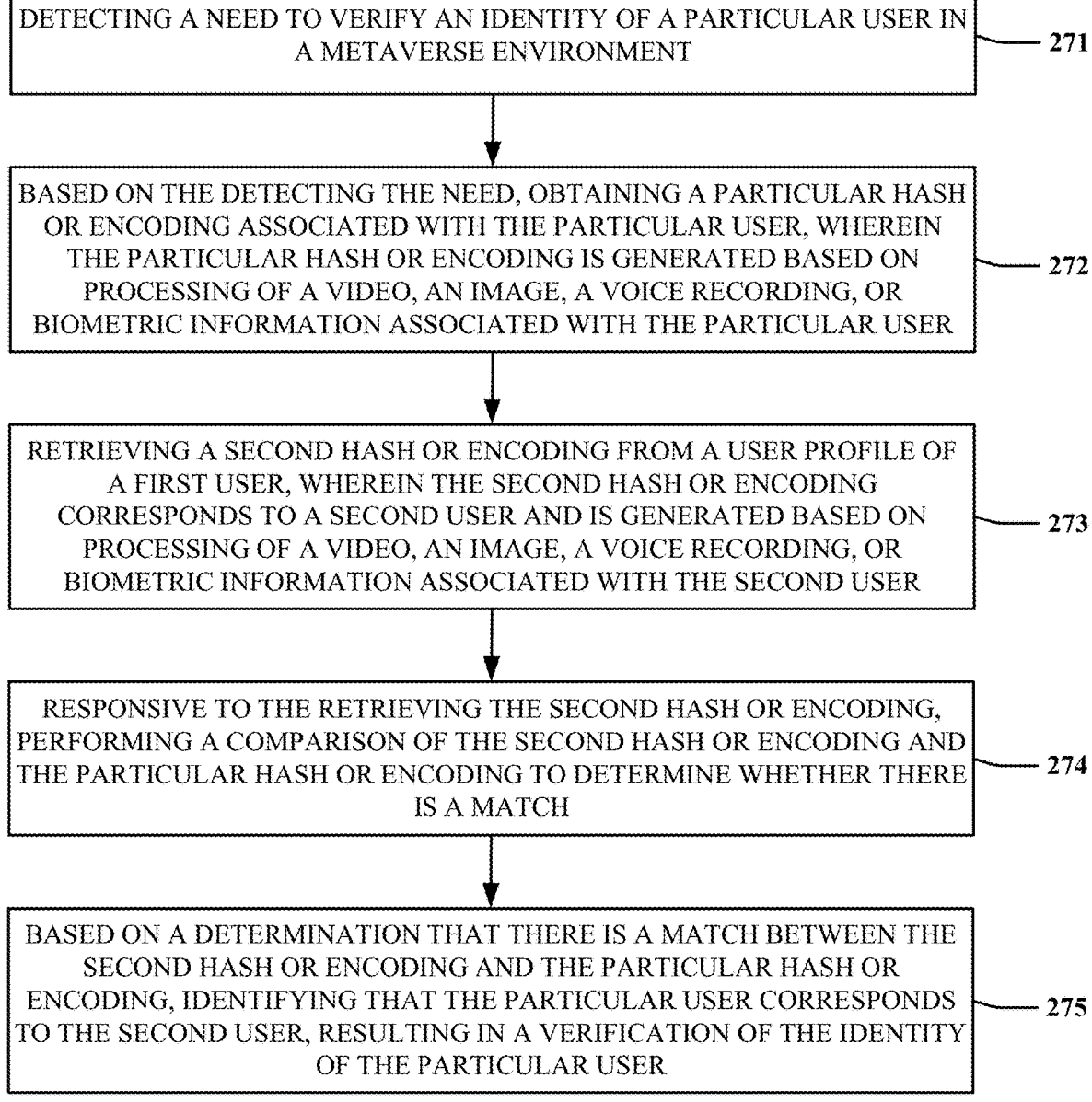

DETECTING A NEED TO VERIFY AN IDENTITY OF A PARTICULAR USER IN A METAVERSE ENVIRONMENT — 271

BASED ON THE DETECTING THE NEED, OBTAINING A PARTICULAR HASH OR ENCODING ASSOCIATED WITH THE PARTICULAR USER, WHEREIN THE PARTICULAR HASH OR ENCODING IS GENERATED BASED ON PROCESSING OF A VIDEO, AN IMAGE, A VOICE RECORDING, OR BIOMETRIC INFORMATION ASSOCIATED WITH THE PARTICULAR USER — 272

RETRIEVING A SECOND HASH OR ENCODING FROM A USER PROFILE OF A FIRST USER, WHEREIN THE SECOND HASH OR ENCODING CORRESPONDS TO A SECOND USER AND IS GENERATED BASED ON PROCESSING OF A VIDEO, AN IMAGE, A VOICE RECORDING, OR BIOMETRIC INFORMATION ASSOCIATED WITH THE SECOND USER — 273

RESPONSIVE TO THE RETRIEVING THE SECOND HASH OR ENCODING, PERFORMING A COMPARISON OF THE SECOND HASH OR ENCODING AND THE PARTICULAR HASH OR ENCODING TO DETERMINE WHETHER THERE IS A MATCH — 274

BASED ON A DETERMINATION THAT THERE IS A MATCH BETWEEN THE SECOND HASH OR ENCODING AND THE PARTICULAR HASH OR ENCODING, IDENTIFYING THAT THE PARTICULAR USER CORRESPONDS TO THE SECOND USER, RESULTING IN A VERIFICATION OF THE IDENTITY OF THE PARTICULAR USER — 275

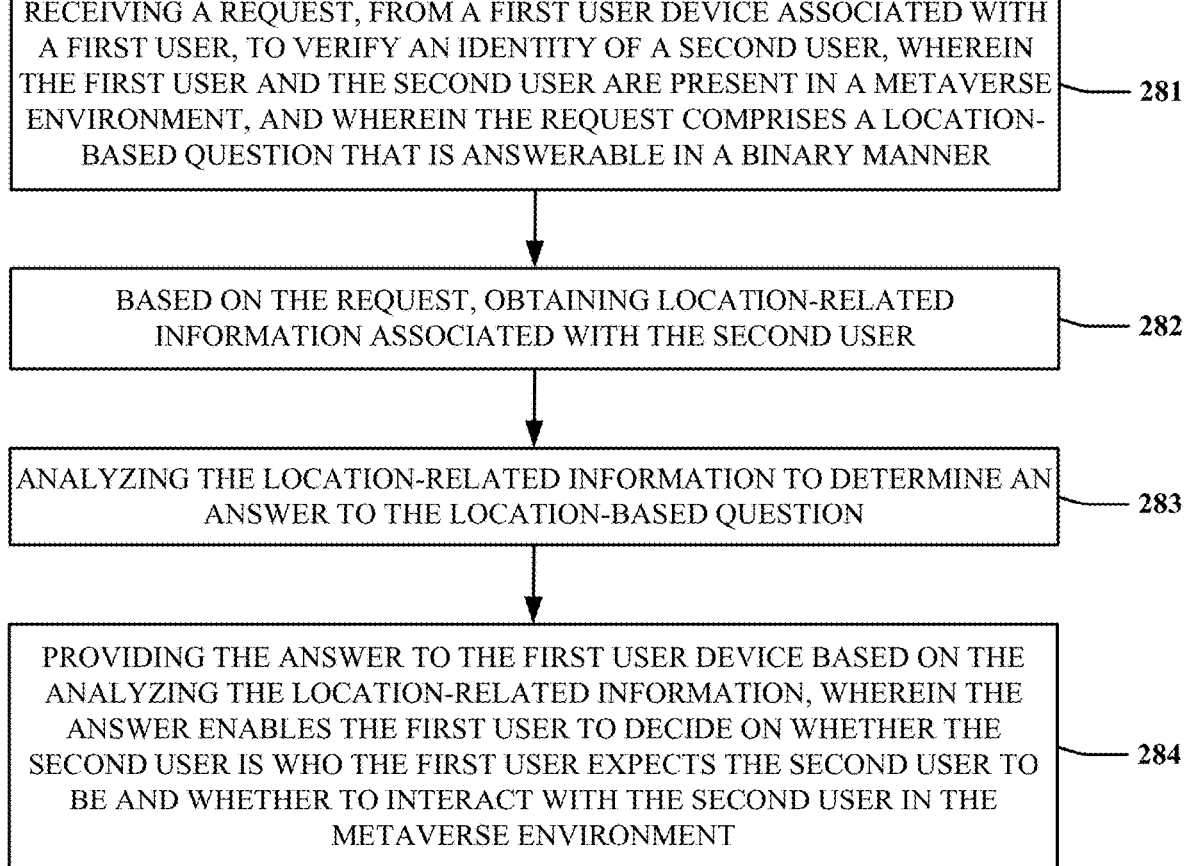

RECEIVING A REQUEST, FROM A FIRST USER DEVICE ASSOCIATED WITH A FIRST USER, TO VERIFY AN IDENTITY OF A SECOND USER, WHEREIN THE FIRST USER AND THE SECOND USER ARE PRESENT IN A METAVERSE ENVIRONMENT, AND WHEREIN THE REQUEST COMPRISES A LOCATION-BASED QUESTION THAT IS ANSWERABLE IN A BINARY MANNER — 281

BASED ON THE REQUEST, OBTAINING LOCATION-RELATED INFORMATION ASSOCIATED WITH THE SECOND USER — 282

ANALYZING THE LOCATION-RELATED INFORMATION TO DETERMINE AN ANSWER TO THE LOCATION-BASED QUESTION — 283

PROVIDING THE ANSWER TO THE FIRST USER DEVICE BASED ON THE ANALYZING THE LOCATION-RELATED INFORMATION, WHEREIN THE ANSWER ENABLES THE FIRST USER TO DECIDE ON WHETHER THE SECOND USER IS WHO THE FIRST USER EXPECTS THE SECOND USER TO BE AND WHETHER TO INTERACT WITH THE SECOND USER IN THE METAVERSE ENVIRONMENT — 284

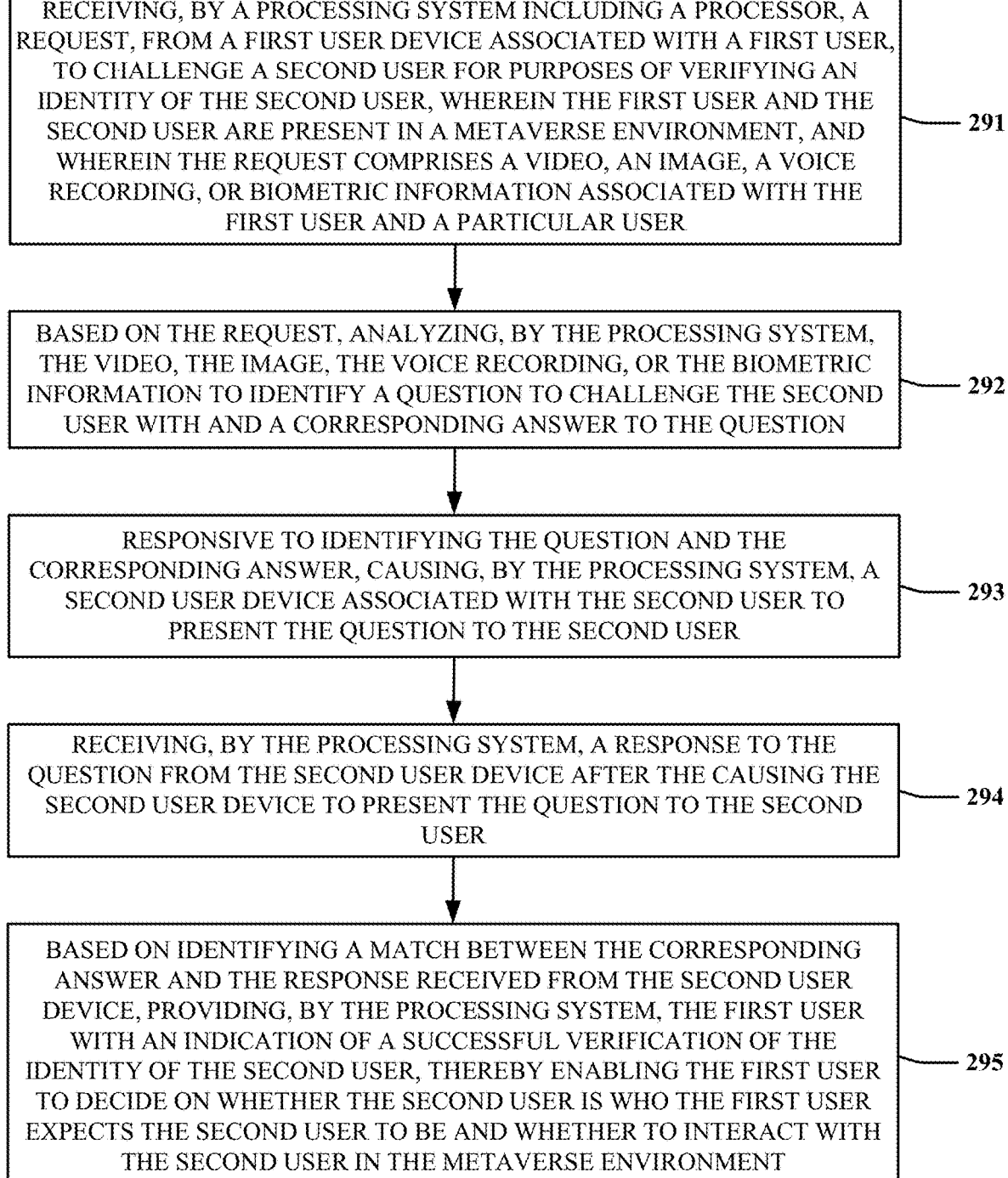

RECEIVING, BY A PROCESSING SYSTEM INCLUDING A PROCESSOR, A REQUEST, FROM A FIRST USER DEVICE ASSOCIATED WITH A FIRST USER, TO CHALLENGE A SECOND USER FOR PURPOSES OF VERIFYING AN IDENTITY OF THE SECOND USER, WHEREIN THE FIRST USER AND THE SECOND USER ARE PRESENT IN A METAVERSE ENVIRONMENT, AND WHEREIN THE REQUEST COMPRISES A VIDEO, AN IMAGE, A VOICE RECORDING, OR BIOMETRIC INFORMATION ASSOCIATED WITH THE FIRST USER AND A PARTICULAR USER — 291

BASED ON THE REQUEST, ANALYZING, BY THE PROCESSING SYSTEM, THE VIDEO, THE IMAGE, THE VOICE RECORDING, OR THE BIOMETRIC INFORMATION TO IDENTIFY A QUESTION TO CHALLENGE THE SECOND USER WITH AND A CORRESPONDING ANSWER TO THE QUESTION — 292

RESPONSIVE TO IDENTIFYING THE QUESTION AND THE CORRESPONDING ANSWER, CAUSING, BY THE PROCESSING SYSTEM, A SECOND USER DEVICE ASSOCIATED WITH THE SECOND USER TO PRESENT THE QUESTION TO THE SECOND USER — 293

RECEIVING, BY THE PROCESSING SYSTEM, A RESPONSE TO THE QUESTION FROM THE SECOND USER DEVICE AFTER THE CAUSING THE SECOND USER DEVICE TO PRESENT THE QUESTION TO THE SECOND USER — 294

BASED ON IDENTIFYING A MATCH BETWEEN THE CORRESPONDING ANSWER AND THE RESPONSE RECEIVED FROM THE SECOND USER DEVICE, PROVIDING, BY THE PROCESSING SYSTEM, THE FIRST USER WITH AN INDICATION OF A SUCCESSFUL VERIFICATION OF THE IDENTITY OF THE SECOND USER, THEREBY ENABLING THE FIRST USER TO DECIDE ON WHETHER THE SECOND USER IS WHO THE FIRST USER EXPECTS THE SECOND USER TO BE AND WHETHER TO INTERACT WITH THE SECOND USER IN THE METAVERSE ENVIRONMENT — 295

METHOD AND SYSTEM FOR OUT-OF-BAND USER IDENTIFICATION IN THE METAVERSE VIA BIOGRAPHICAL (BIO) ID

FIELD OF THE DISCLOSURE

The subject disclosure relates to out-of-band user identification or verification in the metaverse via biographical IDs.

BACKGROUND

Hailed as the next generation of the Internet, the metaverse enables interactions between the physical and digital worlds. For instance, the metaverse may offer an extended reality (XR) (e.g., augmented reality (AR), virtual reality (VR), or mixed reality (MR)) environment where users can explore, play, shop, socialize, or otherwise engage themselves in digitally-created spaces.

BRIEF DESCRIPTION OF THE DRAWINGS

Reference will now be made to the accompanying drawings, which are not necessarily drawn to scale, and wherein:

FIG. 2B is a block diagram illustrating an example, non-limiting embodiment of a system functioning within, in conjunction with, or operatively overlaid upon, the communications network of FIG. 1 and/or the system of FIG. 2A, in accordance with various aspects described herein.

FIG. 2E depicts an illustrative embodiment of a method in accordance with various aspects described herein.

FIG. 2F depicts an illustrative embodiment of a method in accordance with various aspects described herein.

FIG. 2G depicts an illustrative embodiment of a method in accordance with various aspects described herein.

DETAILED DESCRIPTION

Figure 1:
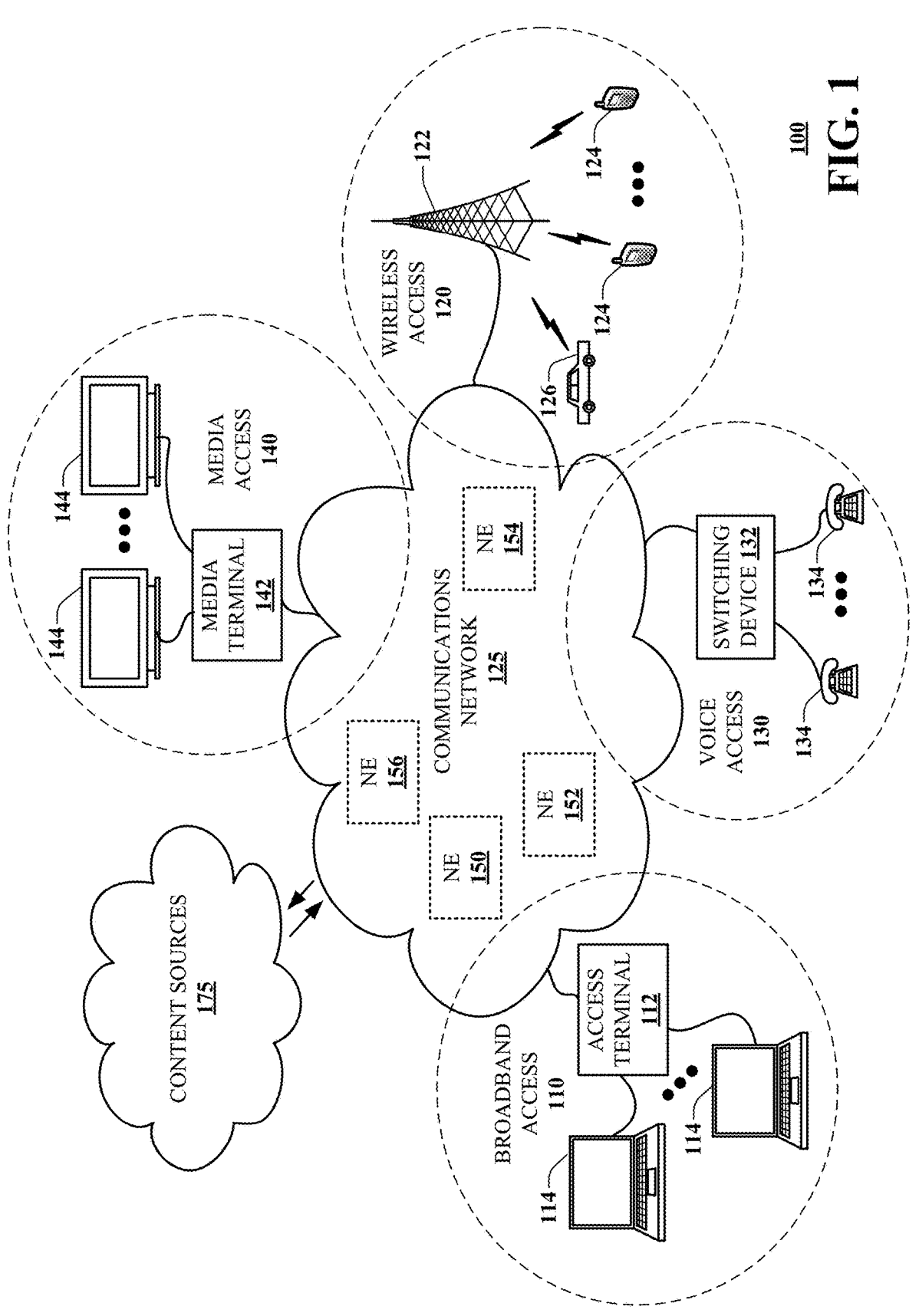
FIG. 1 is a block diagram illustrating an exemplary, non-limiting embodiment of a communications network in accordance with various aspects described herein.

In the real (physical) world, one can easily recognize other people, such as family members, friends, etc., by their visual appearance (e.g., face), voice, or behavior. However, this is generally not possible in the metaverse since users are merely represented by a virtual avatar or some other graphical object. For instance, it can be difficult for one to determine if a user "sitting" in a virtual meeting is really who they purport to be (e.g., that the user is Alice and not Bob). In other cases, two or more avatars may look alike, making it difficult to distinguish between the actual users behind the avatars. A user may even change their avatar or representative object from day to day, further complicating user-to-user interactions in the metaverse when it comes to situations where trust is required among the users. This worsens where multiple metaverses are involved since a given user can have or choose different personas in different virtual worlds that might not look like or resemble one another. It is not unreasonable, therefore, for one to greet another user in the metaverse with "who are you?" rather than the typical "how are you?" Recognition of others and the level or concept of trust is thus drastically different in the virtual world.

The subject disclosure describes, among other things, illustrative embodiments of a member recognition platform that is capable of facilitating member or user recognition in the metaverse based on who they are, what they have (or where they are), and/or what they know. In one or more embodiments, the member recognition platform may be capable of facilitating member or user recognition in the metaverse according to physical characteristics of a user (e.g., bio-related information, such as facial or voice features), mobility-based checks (e.g., location-related checks), and/or personal experience-based (question-and-answer) challenges.

Exemplary embodiments, described herein, provide dynamic (artificial intelligence (AI)/machine learning (ML)-based) generation and extraction of IDs or fingerprints, identification of relationships among such IDs/fingerprints, and performance of user verification checks as proof of IDs. Users within the metaverse may then be able to verify another user's real identity without compromising the privacy of that other user. The verifications may be performed by a metaverse-based system (e.g., implemented in a cloud environment). By leveraging consistent information that "follows" a user across (e.g., various scenarios in) the metaverse, the system can perform out-of-band user verification or authentication to facilitate trusted interactions in the metaverse, which improves security of transactions or interactions in the metaverse.

One or more aspects of the subject disclosure include a device, comprising a processing system including a processor, and a memory that stores executable instructions that, when executed by the processing system, facilitate performance of operations. The operations can include detecting a need to verify an identity of a particular user in a metaverse environment. Further, the operations can include, based on the detecting the need, obtaining a particular hash or encoding associated with the particular user, wherein the particular hash or encoding is generated based on processing of a video, an image, a voice recording, or biometric information associated with the particular user. Further, the operations can include retrieving a second hash or encoding from a user profile of a first user, wherein the second hash or encoding corresponds to a second user and is generated based on processing of a video, an image, a voice recording, or biometric information associated with the second user. Further, the operations can include, responsive to the retrieving the second hash or encoding, performing a comparison of the second hash or encoding and the particular hash or encoding to determine whether there is a match. Further, the operations can include, based on a determination that there is a match between the second hash or encoding and the particular hash or encoding, identifying that the particular user corresponds to the second user, resulting in a verification of the identity of the particular user.

One or more aspects of the subject disclosure include a non-transitory machine-readable medium, comprising executable instructions that, when executed by a processing system including a processor, facilitate performance of operations. The operations can include receiving a request, from a first user device associated with a first user, to verify an identity of a second user, wherein the first user and the second user are present in a metaverse environment, and wherein the request comprises a location-based question that is answerable in a binary manner. Further, the operations can include, based on the request, obtaining location-related information associated with the second user. Further, the operations can include analyzing the location-related information to determine an answer to the location-based question. Further, the operations can include providing the answer to the first user device based on the analyzing the location-related information, wherein the answer enables the first user to decide on whether the second user is who the first user expects the second user to be and whether to interact with the second user in the metaverse environment.

One or more aspects of the subject disclosure include a method. The method can comprise receiving, by a processing system including a processor, a request, from a first user device associated with a first user, to challenge a second user for purposes of verifying an identity of the second user, wherein the first user and the second user are present in a metaverse environment, and wherein the request comprises a video, an image, a voice recording, or biometric information associated with the first user and a particular user. Further, the method can include, based on the request, analyzing, by the processing system, the video, the image, the voice recording, or the biometric information to identify a question to challenge the second user with and a corresponding answer to the question. Further, the method can include, responsive to identifying the question and the corresponding answer, causing, by the processing system, a second user device associated with the second user to present the question to the second user. Further, the method can include receiving, by the processing system, a response to the question from the second user device after the causing the second user device to present the question to the second user. Further, the method can include, based on identifying a match between the corresponding answer and the response received from the second user device, providing, by the processing system, the first user with an indication of a successful verification of the identity of the second user, thereby enabling the first user to decide on whether the second user is who the first user expects the second user to be and whether to interact with the second user in the metaverse environment.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, member or user recognition in the metaverse according to physical characteristics of a user (e.g., bio-related information, such as facial or voice features), mobility-based checks (e.g., location-related checks), and/or personal experience-based (question-and-answer) challenges. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
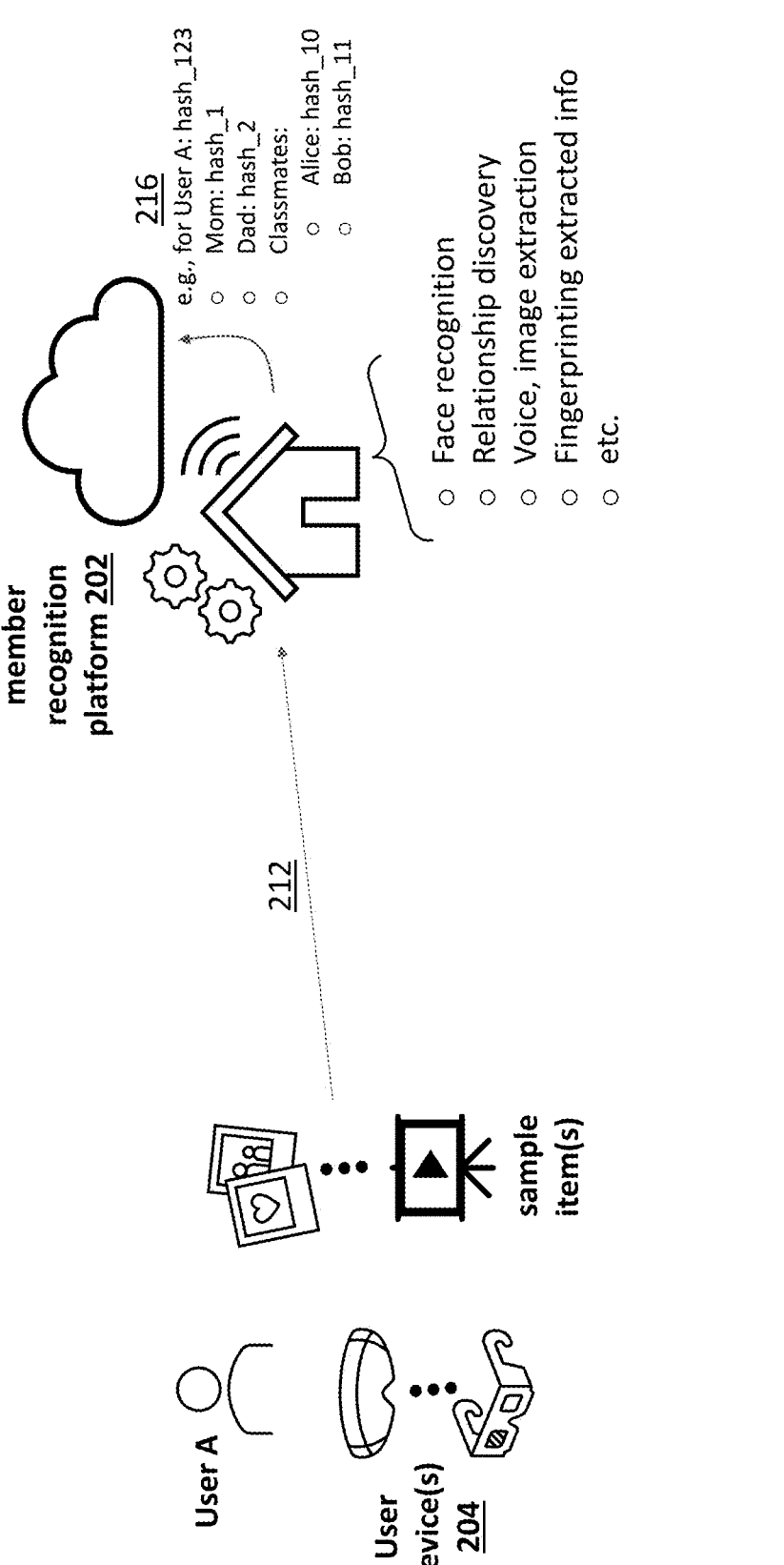
FIG. 2A is a block diagram illustrating an example, non-limiting embodiment of a system functioning within, in conjunction with, or operatively overlaid upon, the communications network of FIG. 1 in accordance with various aspects described herein.

FIG. 2A is a block diagram illustrating an example, non-limiting embodiment of a system 200 functioning within, in conjunction with, or operatively overlaid upon, the communications network 100 of FIG. 1 in accordance with various aspects described herein. As shown in FIG. 2A, the system 200 can include a member recognition platform 202 and one or more user devices 204.

As described herein, the member recognition platform 202 may be equipped with one or more (e.g., AI/ML) algorithms configured to provide a variety of functions, including, but not limited to facial/voice recognition, fingerprinting of facial/voice features, user relationship discovery, mobility-based identity verification, and/or user identity challenging, as described herein. In one or more embodiments, the member recognition platform 202 may be associated with or included in a metaverse system infrastructure operated by one or more metaverse service providers. A given metaverse service provider may operate one or more immersion engine(s) that are implemented in server device(s) and configured to provide functions or capabilities relating to facilitating and managing metaverse/immersive environments or experiences (including generating and presenting metaverse objects) for users. In various embodiments, an immersion engine may provide AR environments, VR environments, or a combination of both in the metaverse. Thus, metaverse services facilitated by the network system 200 can be purely virtual and/or can involve interactions between the virtual and physical worlds. A metaverse object (i.e., an immersion) may include one or more user-interactable AR-, VR-, or MR-based constructs (e.g., three-dimensional (3D) graphic(s)/item(s), video object(s), audio object(s), and/or the like) that are designed to provide an immersive user experience, whether in the context of a game, a meeting, or other types of user-based interactions. For example, a metaverse object may include a virtual character or pathway that, when engaged by a user, interacts with the user (e.g., moves or talks with the user) and/or leads the user into an immersion (e.g., guides the user along a route, transitions the immersive environment to a different room or place, shows the user a video, etc.). As another example, a metaverse object may include a resource (e.g., a racecar, a weapon, etc.) that a user may control or manipulate in an immersive environment to achieve a goal. As yet another example, a metaverse object may include an icon or figure (e.g., an avatar) that represents a real user in a virtual world. In the metaverse, there may be numerous metaverse objects that are available for user engagement and/or control.

A user device 204 may correspond to a user (e.g., here, a user A) and may include, for example, a communication and/or computing device, such as a wearable communication device (e.g., a smart wristwatch, a pair of smart eyeglasses, media-related gear (e.g., a pair of AR, VR, or MR glasses, a headset, headphones, and/or the like), etc.), a mobile phone (e.g., a smart phone, a radiotelephone, etc.), a desktop computer, a laptop computer, a tablet computer, a handheld computer, a display device, a gaming device, a similar type of device, or a combination of some or all of these devices.

Although not shown, the user device(s) 204 and the member recognition platform 202 may be communicatively coupled to one another over one or more networks, such as one or more wired and/or wireless networks. For example, the network(s) may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

In exemplary embodiments, the member recognition platform 202 may be capable of facilitating member or user recognition according to physical characteristics of a user. This can help answer the question of "who are you?" that one might ask when there is a need to confirm the real identities of others in the metaverse. As shown by reference number 212 of FIG. 2A, the member recognition platform 202 may obtain, from the user device(s) 204, one or more sample items corresponding to the user A and/or one or more other users or members associated with the user A. Such other users or members may include the user A's family members, friends, acquaintances, colleagues, classmates, and so on. The sample item(s) may include video recordings, images, voice recordings, and/or biometric information (e.g., fingerprints, etc.) of the user A and/or the other user(s) or member(s). Step 212 can be performed during initial registration of user A with a metaverse system or at any other point during user engagement in a metaverse environment. In some cases, the user A can use the user device(s) 204 to capture live images, videos, voice recordings, or biometric information of the user A and/or one or more other users or members. Alternatively, the user A can upload previously-captured images, videos, voice recordings, or biometric information of the user A and/or one or more other users or members.

As shown by reference number 216, the member recognition platform 202 may process the sample item(s) and generate hashes or encodings thereof. The member recognition platform 202 may generate such hashes or encodings using any suitable algorithm or formula that takes input(s) and uses the input(s) to output one or more unique values or IDs. In one or more embodiments, the member recognition platform 202 may perform various processing on the sample item(s), such as speech-to-text conversion processing, natural language processing, image-based processing (e.g., facial recognition, gesture recognition, etc.), or the like. As an example, the processing may include facial recognition processing, where facial landmarks of a user, such as the distance between the eyes, length or width of the nose, shape of the cheekbones, and so on are characterized or measured. As another example, the processing may include audio-based processing, where amplitude modulation (AM) and/or frequency modulation (FM) is used to characterize a user's voice or manner of speech. Other processing techniques may be employed on videos, images, audio, or gestures to biometrically fingerprint a user.

In various embodiments, the member recognition platform 202 may store the generated hashes or encodings for a corresponding identified individual in a secure ledger or other database associated with user A's account. In some embodiments, the member recognition platform 202 may store the information in a user profile for the user A along with associated relationships between the user A and each identified individual. For example, in various embodiments, the member recognition platform 202 may associate the generated hash/encoding for the user A with an avatar (or other metaverse-based representative object) corresponding to the user A. In one or more embodiments, the member recognition platform 202 may associate a hash/encoding generated for a given other user or member with an avatar (or other metaverse-based representative object) corresponding to that other user. Here, user A may specify such a corresponding avatar to the member recognition platform 202 so that it can be associated with that other user. In some embodiments, the member recognition platform 202 may, for a given identified user or member, query the user A for relationship information or annotations (e.g., "mom," "dad," "friend," etc.) or alternatively "auto-discover" or classify the relationship (such as by accessing and analyzing social media profiles or posts associated with the user A). In this way, the member recognition platform 202 may generate/update a user profile for a given user based on fingerprints obtained from processing of sample item(s) and define relationships among the user A and other user(s) or member(s).

It is to be understood and appreciated that some or all of the above-described functions of the member recognition platform 202 may alternatively be performed by the user device(s) 204. For instance, in certain exemplary embodiments, the user device(s) 204 may obtain the one or more sample items corresponding to the user A and/or one or more other users or members associated with the user A, process these sample item(s), and generate corresponding hashes/encodings therefor. In these embodiments, the user device(s) 204 may provide only the generated hashes/encodings (along with any relationship annotations), and not any of the actual sample item(s), to the member recognition platform 202. This ensures user privacy since user images, videos, voice recordings, or biometric information may never leave the user device(s) 204, and only the hashes/encodings (and corresponding relationship information) are passed to and stored in the metaverse system.

It is also to be understood and appreciated that a user's profile data may include other information (e.g., associated with the user, associated with a class of users that includes the user, and/or associated with users in general), data regarding a location of the user (or a present navigation of the user to a location), data regarding inputs provided by the user (e.g., voice-based commands, gesture-based commands, and so on), data regarding a present expression of interest or intent of the user (e.g., a media content item (e.g., video, audio, etc.) that the user has requested or is presently consuming, a topic or subject identified by the user, etc.), data regarding an immersive environment or content that the user is currently engaged in (e.g., inputs from the user to an immersion, outputs provided by the immersion to the user based on those inputs, a theme of the immersive environment such as activities associated with the immersive environment (e.g., car driving, fishing, etc.), etc.), data regarding applications or immersions related to the immersive environment (e.g., advertising applications or other immersions that interact with, are linked to, or that can otherwise be selectively experienced via or through the immersive environment, etc.), calendar/travel-related data associated with the user (e.g., that identify the user's current/upcoming schedule and/or travel route), data regarding a present time of day, weather data, data regarding structures (e.g., buildings or other objects) at or near the user's location, and/or the like.

In one or more embodiments, the member recognition platform 202 may be capable of comparing hashes/encodings associated with users or members so as to facilitate trusted user interactions in the metaverse environment. The member recognition platform 202 may be configured to employ any suitable method or algorithm to perform such comparisons, such as, for instance, fuzzy matching (e.g., fuzzy logic, approximate string matching, fuzzy name matching, or fuzzy string matching) or other AI/ML technique(s) that identify similar, but not necessarily identical elements in a data set. FIG. 2B is a block diagram illustrating an example, non-limiting embodiment of a system 220 functioning within, in conjunction with, or operatively overlaid upon, the communications network 100 of FIG. 1 and/or the system 200 of FIG. 2A, in accordance with various aspects described herein. The example immersive scenario shown in FIG. 2B relates to a party, although similar functions may be performed for other immersive scenarios or settings (e.g., a user-to-user interaction, a group meeting or gathering, a virtual concert or show, etc.). Here, for instance, the user A may invite family members to a virtual party, where several user avatars then appear at the event (e.g., in the user A's virtual home, a virtual party room/location, or a virtual anteroom). As shown by reference number 222, the member recognition platform 202 may receive a request from the user device 204 to verify the identities of one or more of the arriving users. In alternate embodiments, the member recognition platform 202 may verify the identity of an arriving user based upon another condition being satisfied, such as based upon detecting that the arriving user's avatar is located within a threshold (e.g., metaverse-based) distance from the event location, based upon detecting that the arriving user has requested to join or enter an event (e.g., by "touching" or "ringing" a virtual doorbell of the virtual event location), and/or the like. In any case, the member recognition platform 202 may, at 224, perform a comparison of a hash/encoding associated with the arriving user with hashes/encodings stored in the user A's profile in order to determine whether the arriving user is an invitee to the event. In exemplary embodiments, the member recognition platform 202 may identify permitted invitees based on event-related information (e.g., family members only) and an analysis of relationship data identified in user A's profile (e.g., family status designators, such as "mom," "brother," etc.) Where the arriving user has previously registered on the metaverse system and thus has a corresponding hash/encoding already stored in the metaverse system (e.g., similar to that described above with respect to FIG. 2A), the member recognition platform 202 may retrieve that corresponding hash/encoding and compare it with hashes/encodings stored in the user A's profile to identify a match. In a different situation where no hash/encoding has previously been generated for the arriving user as part of the user's registration with the system, the member recognition platform 202 may cause (e.g., based on receiving the arriving user's permission) the user device of the arriving user to capture a live video recording, image, voice sample, or biometric information of the arriving user for verification purposes. In this situation, the member recognition platform 202 may obtain a hash/encoding value from the user device of the arriving user or, alternatively, obtain the captured video, image, voice recording, or biometric information from the user device of the arriving user and generate a hash/encoding value therefrom (e.g., similar to that described above with respect to FIG. 2A). The member recognition platform 202 may then compare the obtained/ generated hash/encoding with hashes/encodings stored in the user A's profile to identify a match. Where a match is identified, the arriving user may be permitted to enter or join the event. Otherwise, the member recognition platform 202 may restrict the arriving user from entering or joining the event.

Figure 2C:
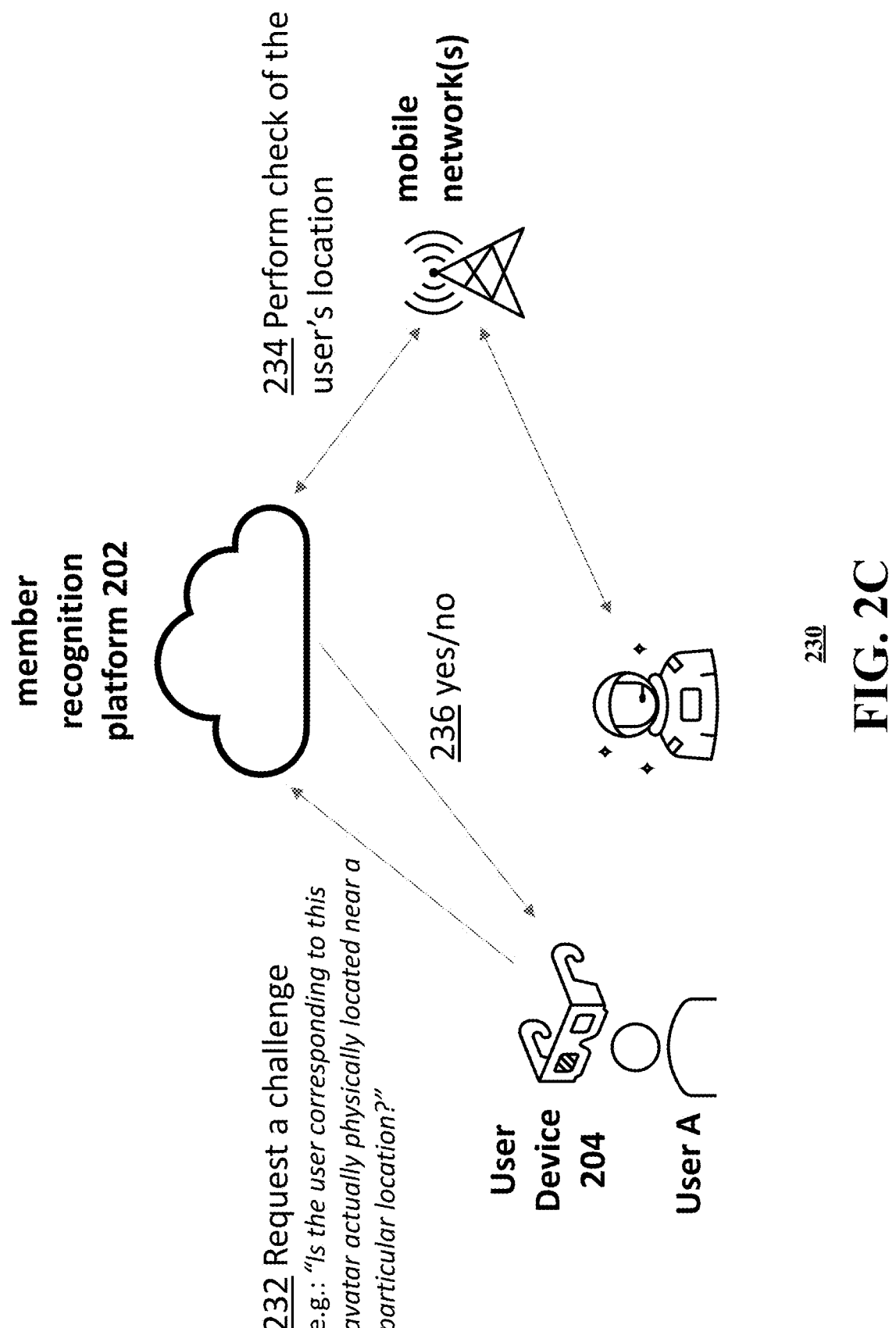
FIG. 2C is a block diagram illustrating an example, non-limiting embodiment of a system functioning within, in conjunction with, or operatively overlaid upon, the communications network of FIG. 1, the system of FIG. 2A, and/or the system of FIG. 2B in accordance with various aspects described herein.

In exemplary embodiments, the member recognition platform 202 may be capable of facilitating member or user recognition according to the location of device(s) associated with a user. This can help answer the question "what do you have?" or "where are you?" that one might ask when there is a need to confirm the real identities of others in the metaverse. For instance, FIG. 2C is a block diagram illustrating an example, non-limiting embodiment of a system 230 functioning within, in conjunction with, or operatively overlaid upon, the communications network 100 of FIG. 1, the system 200 of FIG. 2A, and/or the system 220 of FIG. 2B, in accordance with various aspects described herein. The example immersive scenario shown in FIG. 2C relates to a user-to-user interaction, although similar functions may be performed for other immersive scenarios or settings (e.g., a party, a group meeting or gathering, a virtual concert or show, etc.). Here, for instance, the user A may wish to share or show sensitive information or content to another user— e.g., user A's brother—in a metaverse environment or may wish to invite that user into a private virtual space in the immersion. As shown by reference number 232, the member recognition platform 202 may receive a request from the user device 204 to verify some piece of information regarding the user whose avatar is present with the user A.

In one or more embodiments, the request may be posed as a question that can be answered in a binary manner (e.g., yes (true)/no (false)), without jeopardizing the privacy of the user that is to be verified. In exemplary embodiments, the question may relate to location—e.g., "Is this user located in New Jersey?" (such as in a case where the user A knows that the brother should be at his home in New Jersey and would like to verify that the present user is really the brother). In various embodiments, the member recognition platform 202 may employ one or more algorithms to analyze and understand the user A's request/question.

As shown by reference number 234, the member recognition platform 202 may attempt to obtain information to answer the posed question. As part of its attempt to answer the question, and depending on the implementation or need, the member recognition platform 202 may or may not seek the assistance of an external network (e.g., a mobile network) associated with the user that is to be verified. For instance, in some embodiments, the member recognition platform 202 may identify (i.e., in the metaverse service provider's own current and/or historical user login or location records) the location of the user device associated with user being verified. As another example, the member recognition platform 202 may alternatively submit a request to an identified mobile network associated with the user device of the user that is to be verified. In this example, the request may include the actual question posed by the user A or a query that includes the question in a modified form (such as in a predetermined query format previously agreed upon between the member recognition platform 202 and the mobility network). Continuing this example, the member recognition platform 202 may submit the request along with or using a token provided by the mobility network for purposes of submitting such requests. In this way, the member recognition platform 202 may identify or obtain a location or network fingerprint associated with the user that is to be verified to determine an answer to user A's question. Assuming that the member recognition platform 202 determines that the user that is to be verified is currently located where the user A expects the user to be (e.g., in New Jersey), the member recognition platform 202 may respond (236) to the user A with a short answer (e.g., "Yes"). Assuming that the member recognition platform 202 determines that the user that is to be verified is currently located elsewhere (e.g., California), the member recognition platform 202 may respond (236) to the user A with a short answer (e.g., "No"). In either case, the user A may then be equipped to decide whether the present user is truly who the user A believes that user to be and whether to continue interacting with that user.

In exemplary embodiments, the above-described mobility-based check can be implemented as a standalone solution for verifying the identity of a user in the metaverse. In some embodiments, the mobility-based check can be performed in addition to the hash/encoding-based verification described above with respect to FIG. 2A. In these embodiments, verifying the location of a user, as described herein, can provide an additional level of authentication (e.g., whether through a mobility network or otherwise) to the verification process.

Furthermore, user location/activity privacy can be ensured by returning only binary answers to posed questions. In certain embodiments, the member recognition platform 202 may reject questions that exceed a certain level of granularity as determined based on an analysis of an intent of the question. As an example, the member recognition platform 202 may be configured or trained (via AI/ML) to reject questions that require answers not in a binary form, such as "Where is this user located in the real world?", "What is this user's real name and age?", etc. In alternate embodiments, the member recognition platform 202 may nevertheless accept such question types, but may prompt the user that is to be verified for permission to share the requested answers. For instance, in a case where the user A asks for the present user's actual location, the member recognition platform 202 may cause that user's device to present a confirmation prompt to share that user's actual location. Where the user permits sharing of the user's location, the member recognition platform 202 may then respond to the user A with such detailed information.

In some embodiments, the member recognition platform 202 may be trained to intelligently trigger multiple verification checks depending on the actual challenge request. As an example, in a case where the user A asks "Is this my friend John?", the member recognition platform 202 may be capable of understanding the need to perform a variety of checks to determine the identity of the user. For instance, the member recognition platform 202 may perform the aforementioned hash/encoding comparison, the mobility-based check, and/or one or more other verifications (e.g., by examining profile information associated with the user that is to be verified, etc.) in order to come to a more certain conclusion (e.g., within an acceptable threshold of certainty) as to whether that user is user A's friend (John).

In one or more embodiments, the member recognition platform 202 may additionally, or alternatively, be trained to intelligently ignore a user's question and instead trigger a check for a different question. As an example, over one or more prior user verification checks, the member recognition platform 202 may have identified that a trusted user (e.g., user A's brother) tends to wear two or three wearable devices (e.g., a helmet of a certain brand/model, a watch of certain brand/model, and glasses of a certain brand/model). In this example, in a case where the user A poses a challenge question for a present user that is the same question (such as "Is this user located in New Jersey?") that the user A has asked more than a threshold number of times in the past, the member recognition platform 202 may in addition to (or instead of) checking that user's location, obtain information regarding the devices that that user may be wearing. Here, where the user is wearing the two or three wearables, the member recognition platform 202 may respond to the user A accordingly (e.g., that the present user is user A's brother). In some cases, the member recognition platform 202 may include additional context regarding the verification, such as an indication that an alternative check was made (e.g., "The user's wearables were checked instead.").

Figure 2D:
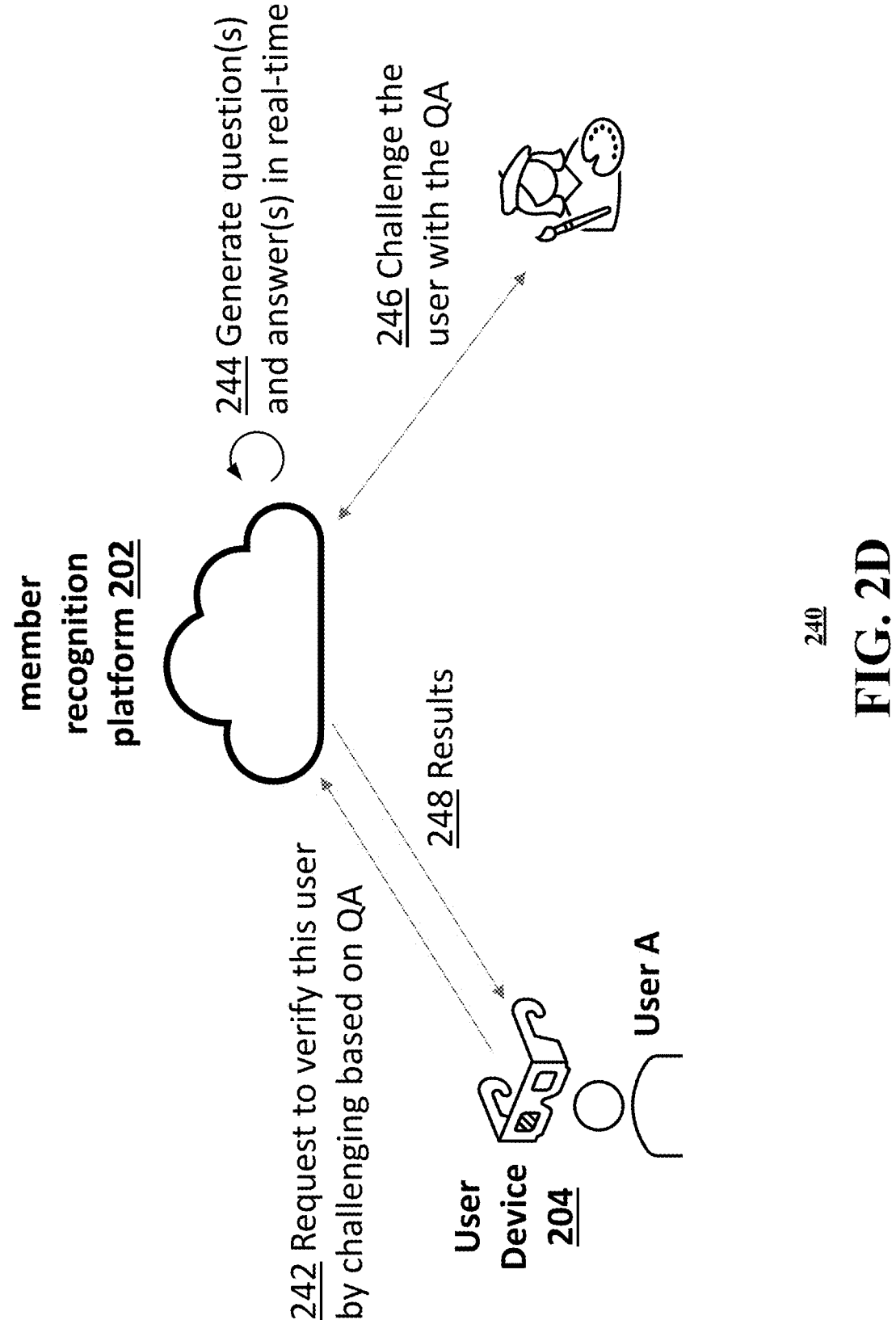
FIG. 2D is a block diagram illustrating an example, non-limiting embodiment of a system functioning within, in conjunction with, or operatively overlaid upon, the communications network 100 of FIG. 1, the system of FIG. 2A, the system of FIG. 2B, and/or the system of FIG. 2C in accordance with various aspects described herein.

In exemplary embodiments, the member recognition platform 202 may be capable of facilitating member or user recognition according to an experience-based query. This can help answer the question "what do you know?" that one might ask when there is a need to confirm the real identities of others in the metaverse. For instance, FIG. 2D is a block diagram illustrating an example, non-limiting embodiment of a system 240 functioning within, in conjunction with, or operatively overlaid upon, the communications network 100 of FIG. 1, the system 200 of FIG. 2A, the system 220 of FIG. 2B, and/or the system 230 of FIG. 2C in accordance with various aspects described herein. The example immersive scenario shown in FIG. 2D relates to a user-to-user interaction, although similar functions may be performed for other immersive scenarios or settings (e.g., a party, a group meeting or gathering, a virtual concert or show, etc.). Here, for instance, the user A may wish to conduct a sensitive discussion with another user—e.g., user A's sister—in a metaverse environment. As shown by reference number 242, the member recognition platform 202 may receive a request from the user device 204 to provide a question-and-answer challenge to the user whose avatar is present with the user A so as to verify that user's identity. In exemplary embodiments, the request may include a content item—e.g., video, image, voice recording, or biometric information—associated with a prior event or engagement (e.g., a gathering in which the user A and the user A's sister were both present). As shown by reference number 244, the member recognition platform 202 may (e.g., automatically using AI/ML) process the content item to extract or identify question-and-answer pairs for purposes of challenging the user that is to be verified. The question-and-answer pairs may relate to detected visual or audio and/or the individuals identified in the content item. For instance, some example question-and-answer pairs may include: (i) Question: "What color hat was David wearing at last week's birthday party?" Answer: "Blue"; (ii) Question: "What song did Mary sing at last week's birthday party?" Answer: "Take Me Home, Country Roads"; and so on. In certain embodiments, the user A may provide user A's own question-and-answer pairs to the member recognition platform 202 for use in the challenge. In any case, as shown by reference number 246, the member recognition platform 202 may challenge the present user using one or more question-and-answer pairs via one or more back-and-forth exchanges with that user. Response(s) may then be provided (248) to the user A, thus enabling the user A to decide whether the present user is truly who the user A believes that user to be and whether to continue interacting with that user.

In certain embodiments, a user may provide (or opt-in) information regarding one or more other services that the user may be subscribed to or utilize (e.g., social media networks, etc.). In these embodiments, the member recognition platform 202 may be configured to utilize that information (e.g., in the form of tokens, application programming interface (API) commands, and/or the like) to query service provider systems to obtain user activity data, such as current/recent locations and so on, some or all of which the member recognition platform 202 may use for user identity verification purposes.

In some cases, an event in the metaverse can be held based on invitation or ticketing. In one or more embodiments, issuance of a virtual ticket or invitation card, for instance, may involve inclusion of a hash or encoding of a purchasing/invited user's face or voice "into" the ticket or invitation for later verification. As an example, the member recognition platform 202 (or another platform) may obtain a live video, image, voice, or biometric capture of the user, generate a hash or encoding therefrom (e.g., similar to that described above with respect to FIGS. 2A and 2B), and associate the generated hash or encoding with (or embed the generated hash or encoding into) a ticket/invitation value or code. Upon arrival to the event, the user may present the ticket/invitation, which may trigger the member recognition platform 202 (or another platform) to obtain a live video, image, voice, or biometric capture of the user, generate a hash or encoding therefrom (e.g., similar to that described above with respect to FIGS. 2A and 2B), and compare the generated hash or encoding with the hash or encoding embedded in the ticket/invitation. Where the member recognition platform 202 identifies a match, the arriving user may be permitted to join or enter the event; otherwise, the arriving user may be restricted therefrom. In this way, only verified purchasing/invited users may be allowed to participate in certain engagements in the metaverse, which discourages fraud and promotes a safer overall virtual environment.

It is to be understood and appreciated that the quantity and arrangement of platforms, systems, networks, and devices shown in FIGS. 2A-2D are provided as an example. In practice, there may be additional platforms, systems, networks, and/or devices, fewer platforms, systems, networks, and/or devices, different platforms, systems, networks, and/or devices, or differently arranged platforms, systems, networks, and/or devices than those shown in FIGS. 2A-2D. For example, the systems 200, 220, 230, and/or 240 can include more or fewer platforms, systems, networks, and/or devices, etc. In practice, therefore, there can be hundreds, thousands, millions, billions, etc. of such platforms, systems, networks, and/or devices. In this way, example systems 200, 220, 230, and/or 240 can coordinate, or operate in conjunction with, a set of platforms, systems, networks, and/or devices and/or operate on data sets that cannot be managed manually or objectively by a human actor. Furthermore, two or more platforms, systems, networks, or devices shown in any of FIGS. 2A-2D may be implemented within a single platform, system, network, or device, or a single platform, system, network, or device shown in any of FIGS. 2A-2D may be implemented as multiple platforms, systems, networks, or devices. Additionally, or alternatively, a set of platforms, systems, networks, or devices of the example systems 200, 220, 230, and/or 240 may perform one or more functions described as being performed by another set of platforms, systems, networks, or devices.

It is also to be understood and appreciated that, although FIGS. 2A-2D are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Additionally, in various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

Furthermore, in various embodiments, the AI or ML algorithm(s) may be configured to reduce any error in its trained tasks (e.g., generation of hashes/encodings, comparisons of hashes/encodings, and so on). In this way, any error that may be present may be provided as feedback to the algorithm(s), such that the error may tend to converge toward zero as the algorithm(s) are utilized more and more.

FIG. 2E depicts an illustrative embodiment of a method 270 in accordance with various aspects described herein. In some embodiments, one or more process blocks of FIG. 2E can be performed by a member recognition platform, such as the member recognition platform 202. In some embodiments, one or more process blocks of FIG. 2E may be performed by another device or a group of devices separate from or including the member recognition platform 202, such as a user device 204.

At 271, the method can include detecting a need to verify an identity of a particular user in a metaverse environment. For example, the member recognition platform 202 can, similar to that described above with respect to the systems 200, 220, 230, and/or 240, perform one or more operations that include detecting a need to verify an identity of a particular user in a metaverse environment.

At 272, the method can include, based on the detecting the need, obtaining a particular hash or encoding associated with the particular user, wherein the particular hash or encoding is generated based on processing of a video, an image, a voice recording, or biometric information associated with the particular user. For example, the member recognition platform 202 can, similar to that described above with respect to the systems 200, 220, 230, and/or 240, perform one or more operations that include, based on the detecting the need, obtaining a particular hash or encoding associated with the particular user, wherein the particular hash or encoding is generated based on processing of a video, an image, a voice recording, or biometric information associated with the particular user.

At 273, the method can include retrieving a second hash or encoding from a user profile of a first user, wherein the second hash or encoding corresponds to a second user and is generated based on processing of a video, an image, a voice recording, or biometric information associated with the second user. For example, the member recognition platform 202 can, similar to that described above with respect to the systems 200, 220, 230, and/or 240, perform one or more operations that include retrieving a second hash or encoding from a user profile of a first user, wherein the second hash or encoding corresponds to a second user and is generated based on processing of a video, an image, a voice recording, or biometric information associated with the second user.

At 274, the method can include, responsive to the retrieving the second hash or encoding, performing a comparison of the second hash or encoding and the particular hash or encoding to determine whether there is a match. For example, the member recognition platform 202 can, similar to that described above with respect to the systems 200, 220, 230, and/or 240, perform one or more operations that include, responsive to the retrieving the second hash or encoding, performing a comparison of the second hash or encoding and the particular hash or encoding to determine whether there is a match.

At 275, the method can include, based on a determination that there is a match between the second hash or encoding and the particular hash or encoding, identifying that the particular user corresponds to the second user, resulting in a verification of the identity of the particular user. For example, the member recognition platform 202 can, similar to that described above with respect to the systems 200, 220, 230, and/or 240, perform one or more operations that include, based on a determination that there is a match between the second hash or encoding and the particular hash or encoding, identifying that the particular user corresponds to the second user, resulting in a verification of the identity of the particular user.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2F depicts an illustrative embodiment of a method 280 in accordance with various aspects described herein. In some embodiments, one or more process blocks of FIG. 2F can be performed by a member recognition platform, such as the member recognition platform 202. In some embodiments, one or more process blocks of FIG. 2F may be performed by another device or a group of devices separate from or including the member recognition platform 202, such as a user device 204.

At 281, the method can include receiving a request, from a first user device associated with a first user, to verify an identity of a second user, wherein the first user and the second user are present in a metaverse environment, and wherein the request comprises a location-based question that is answerable in a binary manner. For example, the member recognition platform 202 can, similar to that described above with respect to the systems 200, 220, 230, and/or 240, perform one or more operations that include receiving a request, from a first user device associated with a first user, to verify an identity of a second user, wherein the first user and the second user are present in a metaverse environment, and wherein the request comprises a location-based question that is answerable in a binary manner.

At 282, the method can include, based on the request, obtaining location-related information associated with the second user. For example, the member recognition platform 202 can, similar to that described above with respect to the systems 200, 220, 230, and/or 240, perform one or more operations that include, based on the request, obtaining location-related information associated with the second user.

At 283, the method can include analyzing the location-related information to determine an answer to the location-based question. For example, the member recognition platform 202 can, similar to that described above with respect to the systems 200, 220, 230, and/or 240, perform one or more operations that include analyzing the location-related information to determine an answer to the location-based question.

At 284, the method can include providing the answer to the first user device based on the analyzing the location-related information, wherein the answer enables the first user to decide on whether the second user is who the first user expects the second user to be and whether to interact with the second user in the metaverse environment. For example, the member recognition platform 202 can, similar to that described above with respect to the systems 200, 220, 230, and/or 240, perform one or more operations that include providing the answer to the first user device based on the analyzing the location-related information, wherein the answer enables the first user to decide on whether the second user is who the first user expects the second user to be and whether to interact with the second user in the metaverse environment.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2G depicts an illustrative embodiment of a method 290 in accordance with various aspects described herein. In some embodiments, one or more process blocks of FIG. 2G can be performed by a member recognition platform, such as the member recognition platform 202. In some embodiments, one or more process blocks of FIG. 2G may be performed by another device or a group of devices separate from or including the member recognition platform 202, such as a user device 204.

At 291, the method can include receiving, by a processing system including a processor, a request, from a first user device associated with a first user, to challenge a second user for purposes of verifying an identity of the second user, wherein the first user and the second user are present in a metaverse environment, and wherein the request comprises a video, an image, a voice recording, or biometric information associated with the first user and a particular user. For example, the member recognition platform 202 can, similar to that described above with respect to the systems 200, 220, 230, and/or 240, perform one or more operations that include receiving, by a processing system including a processor, a request, from a first user device associated with a first user, to challenge a second user for purposes of verifying an identity of the second user, wherein the first user and the second user are present in a metaverse environment, and wherein the request comprises a video, an image, a voice recording, or biometric information associated with the first user and a particular user.

At 292, the method can include, based on the request, analyzing, by the processing system, the video, the image, the voice recording, or the biometric information to identify a question to challenge the second user with and a corresponding answer to the question. For example, the member recognition platform 202 can, similar to that described above with respect to the systems 200, 220, 230, and/or 240, perform one or more operations that include, based on the request, analyzing, by the processing system, the video, the image, the voice recording, or the biometric information to identify a question to challenge the second user with and a corresponding answer to the question.

At 293, the method can include, responsive to identifying the question and the corresponding answer, causing, by the processing system, a second user device associated with the second user to present the question to the second user. For example, the member recognition platform 202 can, similar to that described above with respect to the systems 200, 220, 230, and/or 240, perform one or more operations that include, responsive to identifying the question and the corresponding answer, causing, by the processing system, a second user device associated with the second user to present the question to the second user.

At 294, the method can include receiving, by the processing system, a response to the question from the second user device after the causing the second user device to present the question to the second user. For example, the member recognition platform 202 can, similar to that described above with respect to the systems 200, 220, 230, and/or 240, perform one or more operations that include receiving, by the processing system, a response to the question from the second user device after the causing the second user device to present the question to the second user.

At 295, the method can include, based on identifying a match between the corresponding answer and the response received from the second user device, providing, by the processing system, the first user with an indication of a successful verification of the identity of the second user, thereby enabling the first user to decide on whether the second user is who the first user expects the second user to be and whether to interact with the second user in the metaverse environment. For example, the member recognition platform 202 can, similar to that described above with respect to the systems 200, 220, 230, and/or 240, perform one or more operations that include, based on identifying a match between the corresponding answer and the response received from the second user device, providing, by the processing system, the first user with an indication of a successful verification of the identity of the second user, thereby enabling the first user to decide on whether the second user is who the first user expects the second user to be and whether to interact with the second user in the metaverse environment.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
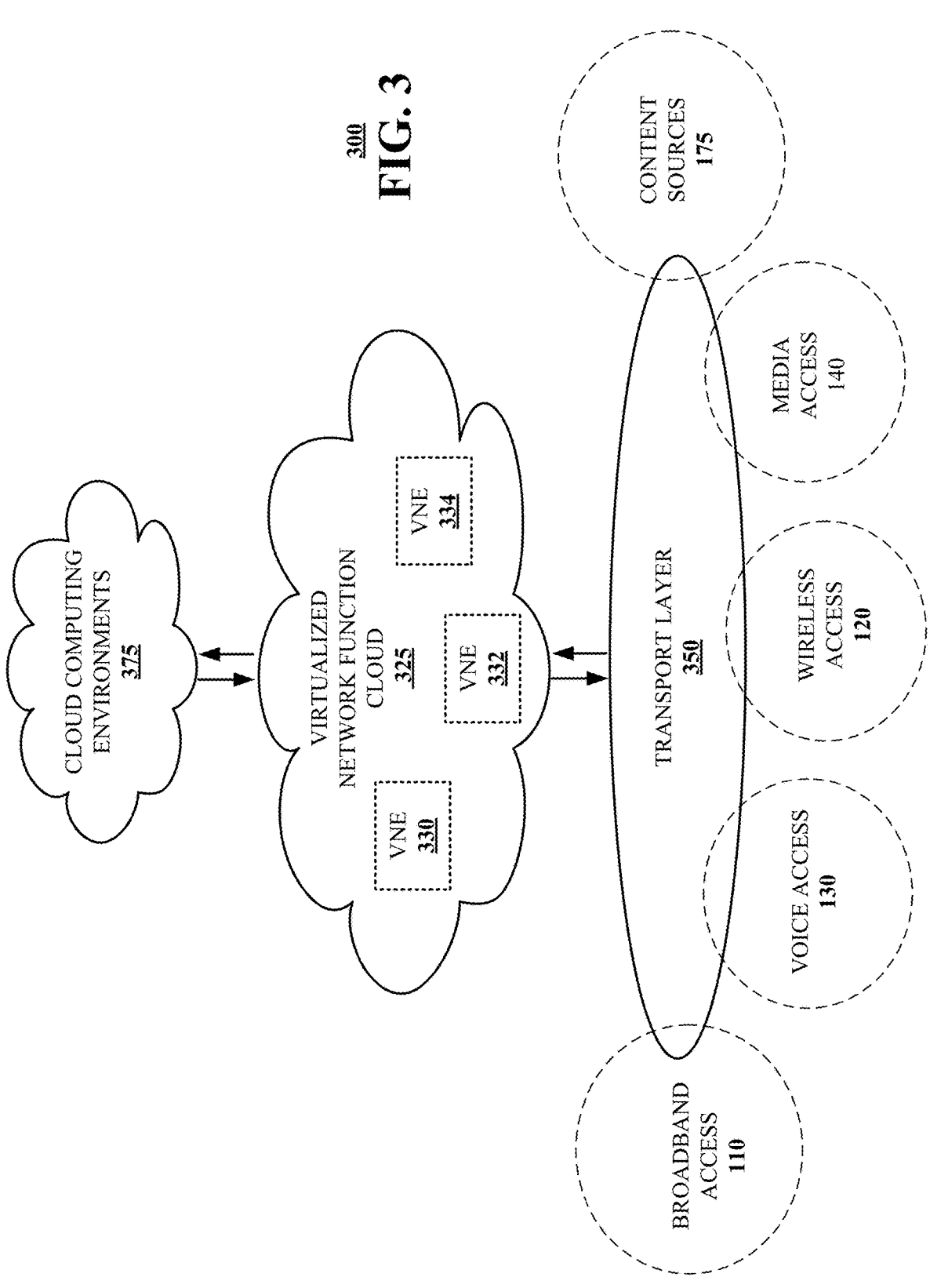
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of systems 200, 220, 230, and/or 240, and methods 270, 280, and/or 290 presented in FIGS. 1 and 2A-2G. For example, virtualized communications network 300 can facilitate, in whole or in part, member or user recognition in the metaverse according to physical characteristics of a user (e.g., bio-related information, such as facial or voice features), mobility-based checks (e.g., location-related checks), and/or personal experience-based (question-and-answer) challenges.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs);

reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
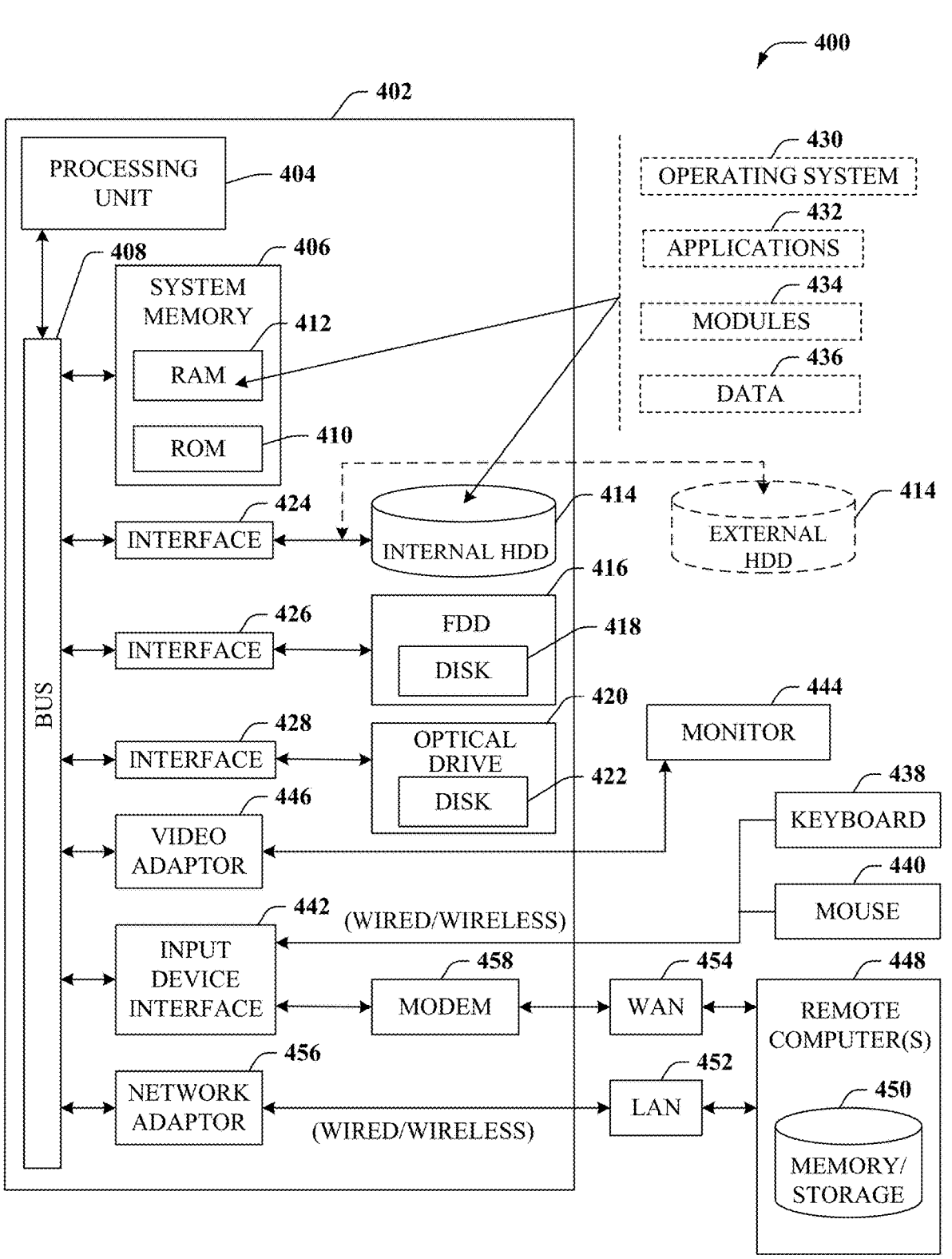
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, member or user recognition in the metaverse according to physical characteristics of a user (e.g., bio-related information, such as facial or voice features), mobility-based checks (e.g., location-related checks), and/or personal experience-based (question-and-answer) challenges.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
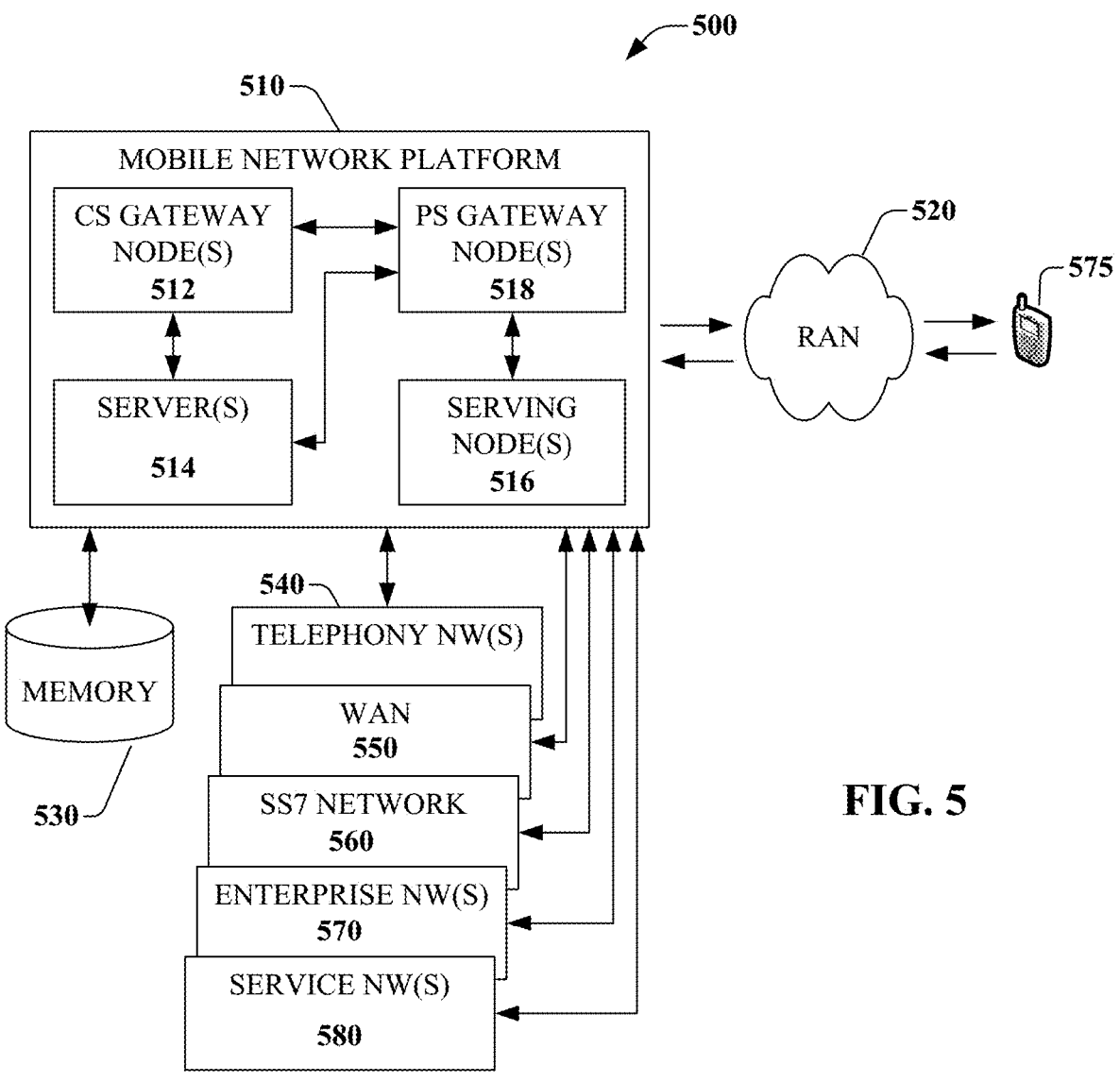
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330,

332, 334, etc. For example, platform 510 can facilitate, in whole or in part, member or user recognition in the metaverse according to physical characteristics of a user (e.g., bio-related information, such as facial or voice features), mobility-based checks (e.g., location-related checks), and/or personal experience-based (question-and-answer) challenges. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
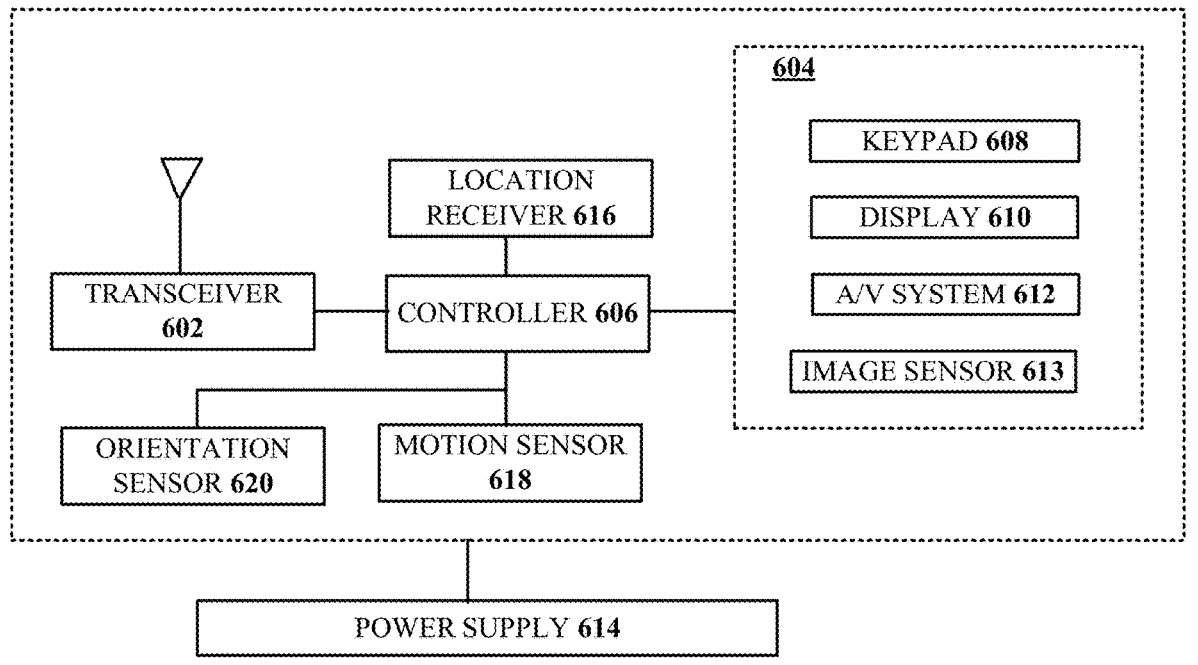
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, member or user recognition in the metaverse according to physical characteristics of a user (e.g., bio-related information, such as facial or voice features), mobility-based checks (e.g., location-related checks), and/or personal experience-based (question-and-answer) challenges.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
detecting a need to verify an identity of a particular user in a metaverse environment, wherein verification of the identity of the particular user is required to facilitate a trusted interaction in the metaverse environment;
based on the detecting the need, classifying the particular user into a class of users based on information associated with the particular user; and
obtaining a particular hash or encoding associated with the particular user, wherein the particular hash or encoding is generated for identity verification purposes based on processing of a video, an image, a voice recording, or biometric information associated with the particular user, wherein only the particular hash or encoding are stored in the metaverse environment;
retrieving a second hash or encoding from a user profile of a first user, wherein the second hash or encoding corresponds to a second user and is generated based on processing of a video, an image, a voice recording, or biometric information associated with the second user;
responsive to the retrieving the second hash or encoding, performing a comparison of the second hash or encoding and the particular hash or encoding to determine whether there is a match; and
based on a determination that there is a match between the second hash or encoding and the particular hash or encoding, and the class of the particular user, identifying that the particular user corresponds to the second user, resulting in a verification of the identity of the particular user.

2. The device of claim 1, wherein the detecting the need is responsive to a request from the first user.

3. The device of claim 1, wherein the detecting the need is responsive to detecting that the particular user is joining or participating in an interaction or event associated with the first user in the metaverse environment.

4. The device of claim 1, wherein the processing system employs one or more artificial intelligence (AI) or machine learning (ML) algorithms to perform one or more of the operations.

5. The device of claim 1, wherein the operations further comprise, based on the determination, notifying the first user of successful verification of the identity of the particular user.

6. The device of claim 1, wherein the operations further comprise, based on a different determination that there is no match between the second hash or encoding and the particular hash or encoding, identifying that the particular user does not correspond to the second user.

7. The device of claim 1, wherein the retrieving is performed in relation to a search of the user profile to identify any hash or encoding stored therein that matches the particular hash or encoding.

8. The device of claim 1, wherein the processing of the video, the image, the voice recording, or the biometric information associated with the particular user or the processing of the video, the image, the voice recording, or the biometric information associated with the second user involves facial recognition techniques or voice recognition techniques.

9. The device of claim 1, wherein the second hash or encoding is generated during prior registration of the first user with a metaverse system associated with the metaverse environment.

10. The device of claim 1, wherein the video, the image, the voice recording, or the biometric information associated with the particular user comprises a live-captured video, image, voice recording, or biometric information, and wherein the live-captured video, image, voice recording, or biometric information do not leave a user device.

11. The device of claim 1, wherein the particular hash or encoding is generated by a particular user device associated with the particular user and not by the processing system.

12. A non-transitory machine-readable medium, comprising executable instructions that, when executed by a processing system including a processor, facilitate performance of operations, the operations comprising:

detecting a need to verify an identity of a particular user in a metaverse environment, wherein verification of the identity of the particular user is required to facilitate a trusted interaction in the metaverse environment;

based on the detecting the need, classifying the particular user into a class of users based on information associated with the particular user; and obtaining a particular hash associated with the particular user, wherein the particular hash is generated for identity verification purposes based on processing of a video, an image, a voice recording, or biometric information associated with the particular user, wherein only the particular hash is stored in the metaverse environment;

retrieving a second hash from a user profile of a first user, wherein the second hash corresponds to a second user and is generated based on processing of a video, an image, a voice recording, or biometric information associated with the second user, wherein the second hash is generated during prior registration of the first user with a metaverse system associated with the metaverse environment;

responsive to the retrieving the second hash, performing a comparison of the second hash and the particular hash to determine whether there is a match; and based on a determination that there is a match between the second hash and the particular hash, and the class of the particular user, identifying that the particular user corresponds to the second user, resulting in a verification of the identity of the particular user.

13. The non-transitory machine-readable medium of claim 12, wherein the detecting the need is responsive to a request from the first user.

14. The non-transitory machine-readable medium of claim 12, wherein the detecting the need is responsive to detecting that the particular user is joining or participating in an interaction or event associated with the first user in the metaverse environment.

15. The non-transitory machine-readable medium of claim 12, wherein the processing system employs one or more artificial intelligence (AI) or machine learning (ML) algorithms to perform one or more of the operations.

16. The non-transitory machine-readable medium of claim 12, wherein the operations further comprise, based on the determination, notifying the first user of successful verification of the identity of the particular user.

17. The non-transitory machine-readable medium of claim 12, wherein the operations further comprise, based on a different determination that there is no match between the second hash and the particular hash, identifying that the particular user does not correspond to the second user.

18. The non-transitory machine-readable medium of claim 12, wherein the retrieving is performed in relation to a search of the user profile to identify any hash stored therein that matches the particular hash.

19. The non-transitory machine-readable medium of claim 12, wherein the processing of the video, the image, the voice recording, or the biometric information associated with the particular user or the processing of the video, the image, the voice recording, or the biometric information associated with the second user involves facial recognition techniques or voice recognition techniques.

20. A method, comprising:

detecting, by a processing system, a need to verify an identity of a particular user in a metaverse environment, wherein verification of the identity of the particular user is required to facilitate a trusted interaction in the metaverse environment;

based on the detecting the need, classifying, by the processing system, the particular user into a class of users based on information associated with the particular user; and receiving, by the processing system, a particular encoding associated with the particular user, wherein the particular encoding is generated for identity verification purposes based on processing of a video, an image, a voice recording, or biometric information associated with the particular user, wherein only the particular encoding is stored in the metaverse environment;

retrieving, by the processing system, a second encoding from a user profile of a first user, wherein the second encoding corresponds to a second user and is generated based on processing of a video, an image, a voice recording, or biometric information associated with the second user;

responsive to the retrieving the second encoding, performing, by the processing system, a comparison of the second encoding and the particular encoding to determine whether there is a match; and based on a determination that there is a match between the second encoding and the particular encoding and the class of the particular user, identifying, by the processing system, that the particular user corresponds to the second user, resulting in a verification of the identity of the particular user.

* * * * *